(12) United States Patent
Schaecher et al.

(10) Patent No.: US 12,173,602 B2
(45) Date of Patent: Dec. 24, 2024

(54) METHOD AND DEVICE FOR IMPROVING WIRELINE LOGGING RATE

(71) Applicant: Halliburton Energy Services, Inc., Houston, TX (US)

(72) Inventors: William Joseph Schaecher, Houston, TX (US); David Yan Lap Wong, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 75 days.

(21) Appl. No.: 17/612,399

(22) PCT Filed: Jul. 11, 2019

(86) PCT No.: PCT/US2019/041370
§ 371 (c)(1),
(2) Date: Nov. 18, 2021

(87) PCT Pub. No.: WO2021/006907
PCT Pub. Date: Jan. 14, 2021

(65) Prior Publication Data
US 2022/0213787 A1    Jul. 7, 2022

(51) Int. Cl.
*E21B 47/12*    (2012.01)
*G01V 11/00*    (2006.01)
(52) U.S. Cl.
CPC ............. *E21B 47/12* (2013.01); *G01V 11/00* (2013.01)

(58) Field of Classification Search
CPC ......... E21B 47/12; E21B 47/26; G01V 11/00; G01V 11/002
See application file for complete search history.

(56) References Cited

U.S. PATENT DOCUMENTS

| | | | | |
|---|---|---|---|---|
| 5,596,602 A | * | 1/1997 | Couwenhoven | H04N 19/126 375/E7.184 |
| 5,684,693 A | * | 11/1997 | Li | G01V 1/42 702/6 |
| 6,195,390 B1 | * | 2/2001 | Hashino | H04N 11/044 375/240.21 |
| 6,366,531 B1 | | 4/2002 | Varsamis et al. | |

(Continued)

FOREIGN PATENT DOCUMENTS

WO    2021006907 A1    1/2021

*Primary Examiner* — Franklin D Balseca
(74) *Attorney, Agent, or Firm* — John Wustenberg; Parker Justiss, P.C.

(57) ABSTRACT

A downhole logging device, a method of logging a wellbore, and a wellbore logging system are disclosed herein. In one example, the wellbore logging system includes surface equipment operable for monitoring logging operations in a wellbore based on downhole data measurements and a downhole logging device, coupled to the surface equipment through a downhole communications link. The downhole logging device includes one or more downhole tools having at least one data sensor each that captures the downhole data measurements from the wellbore, and a data compression unit that provides a data compression portion and a residual data portion of the downhole data measurements, wherein the data compression portion is provided, via the downhole communications link, to the surface equipment for the monitoring, and the residual data portion is stored downhole.

20 Claims, 6 Drawing Sheets

(56) References Cited

U.S. PATENT DOCUMENTS

| | | | | |
|---|---|---|---|---|
| 8,256,565 B2* | 9/2012 | Pabon | ................... | G01V 1/52 |
| | | | | 367/27 |
| 8,811,758 B2* | 8/2014 | Paffenroth | ............. | H04N 19/90 |
| | | | | 708/203 |
| 9,500,762 B2* | 11/2016 | Haramboure | ............ | G01V 3/24 |
| 10,158,534 B2* | 12/2018 | Acharya | ................. | H04W 4/38 |
| 10,724,362 B2* | 7/2020 | Gajic | ................... | E21B 47/18 |
| 11,082,720 B2* | 8/2021 | Tsai | ....................... | H04N 19/85 |
| 2005/0222775 A1 | 10/2005 | Kisra et al. | | |
| 2008/0236837 A1 | 10/2008 | Lovell et al. | | |
| 2010/0287232 A1* | 11/2010 | Huffman | ............ | H04N 7/17327 |
| | | | | 709/247 |
| 2013/0307700 A1 | 11/2013 | Hassan et al. | | |
| 2017/0089195 A1 | 3/2017 | Yu | | |

* cited by examiner

METHOD AND DEVICE FOR IMPROVING WIRELINE LOGGING RATE

CROSS-REFERENCE TO RELATED APPLICATION

This application is the National Stage of, and therefore claims the benefit of, International Application No. PCT/US2019/041370 filed on Jul. 11, 2019, entitled "METHOD AND DEVICE FOR IMPROVING WIRELINE LOGGING RATE," which was published in English under International Publication Number WO 2021/006907 on Jan. 14, 2021. The above application is commonly assigned with this National Stage application and is incorporated herein by reference in its entirety.

TECHNICAL FIELD

This application is directed, in general, to monitoring of hydrocarbon wellbores and, more specifically, to a system and method for improving logging rate and logging duration.

BACKGROUND

In wireline logging, the conventional mode of operation is to transmit downhole logging data to the surface system in real time via digital cable telemetry. The fundamental limitation of this method is the transmission rate of the digital telemetry. The transmission rate can impose limits on such factors as the logging speed, measurement bandwidth, data resolution, a number of sensors used, a number of measurements taken. Overcoming these limitations can require multiple logging passes in order to acquire a sufficient number of data measurements with different assortments of logging tools thereby greatly extending onsite durations.

BRIEF DESCRIPTION

Reference is now made to the following descriptions taken in conjunction with the accompanying drawings, in which.

DETAILED DESCRIPTION

The disclosure addresses an alternative approach to capturing downhole data measurements in logging operations. Instead of limiting a wireline tool string performance with the restrictions of the wireline telemetry rate, the disclosed approach proposes to send a data compressed version of downhole tool data to a surface system and store the difference between the compressed data and the full resolution data (i.e., the residual data) in downhole mass storage. The compressed data rate can be subject to the wireline telemetry rate available, while the deployment time of logging tools in a wellbore is increased by storing only the residual data.

The disclosure enables wireline data logging at rates much higher than cable telemetry data rates, thereby providing higher resolution, higher bandwidth, more sensor channels, more data measurements, higher logging rates and more tool combinations than with cable telemetry alone. Data quality is monitored at the surface by viewing and analyzing the compressed version of the downhole wireline data, while only the residual difference between full resolution and compressed data is stored downhole, thereby increasing the deployment time.

For purposes of the disclosure, data compression is defined as a process of modifying, encoding or converting the bit-structure of data in such a way that it consumes less bandwidth for transmission and less space in memory, thereby reducing its transmission footprint or the storage size of one or more data instances or elements. Data compression can be either lossy or lossless. Lossless compression reduces bits by identifying and eliminating statistical redundancy. No information is lost in lossless compression. Lossy compression reduces bits by removing unnecessary or less important information.

Figure 1:
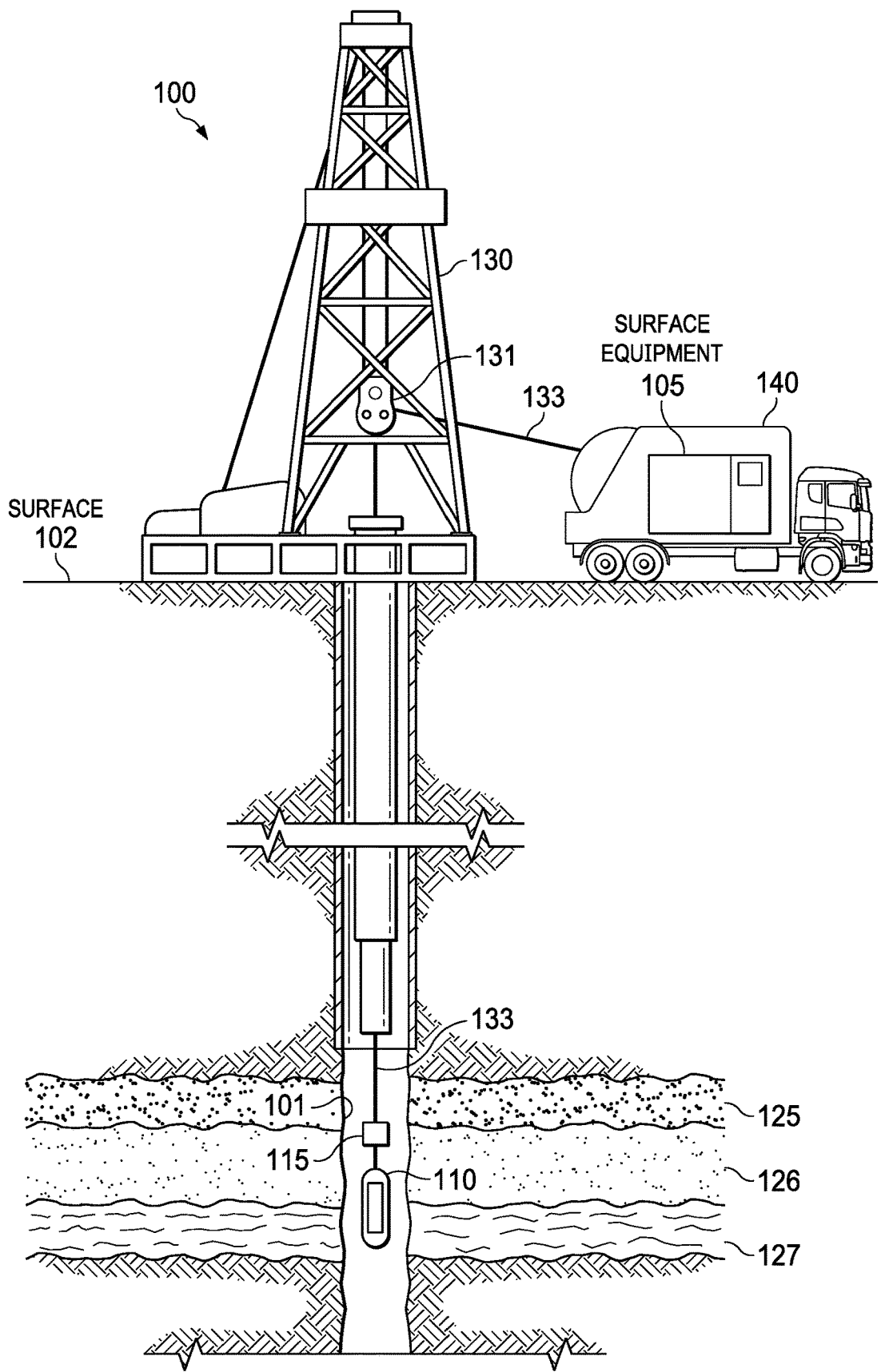
FIG. 1 illustrates a diagram of an example of a wellbore logging system that accumulates downhole data measurements from a wellbore according to the principles of the disclosure.

FIG. 1 illustrates an example of a wellbore logging system, generally designated 100, that accumulates downhole data measurements from a wellbore. During drilling of a wellbore 101 from a surface location 102, it is usually desirable to know additional details about types of downhole formations or formation fluids and their associated characteristics through data collection employing formation logging. To accomplish this goal, the wellbore logging system 100 includes a derrick 130 that supports a traveling block 131 and a downhole logging device 110 employing a sonde or probe that is lowered by a retrievable logging cable 133 into the wellbore 101. The retrievable logging cable 133 is usually a wireline, but may be a coiled tubing, an optical cable or other cable or conveyance suitable for a logging operation. Generally, any retrievable electrical cable conveyance that allows for the operation of a logging tool and provides depth control may be employed.

The downhole logging device 110 of the wellbore logging system 100 includes a depth determination unit (not shown) that forms part of a logging operation that can be used for accurate depth control. The depth determination unit in the downhole logging device 110 provides current depth data from the wellbore 101 through the retrievable logging cable 133. The depth determination unit can include, for example, a gamma ray logging sensor unit or a casing collar locator. Furthermore, a load sensor attached to the retrievable logging cable 133 between an interface 115 and the downhole logging device 110 may be present to further aid in determination of the depth profile along the retrievable logging cable 133.

The downhole logging device 110 may be lowered to a region of interest in the wellbore 101 using the depth data and pulled upward at a substantially constant speed to gain logging information for wellbore structures such as subterranean formations 125, 126 and 127. Additionally, the downhole logging device 110 may have its wellbore speed modified or be held stationary within the wellbore 101 to gather wellbore information at one or more subterranean formations, such as the subterranean formations 125, 126 and 127.

In the illustrated example of FIG. 1, the downhole logging device 110 includes a set or collection of downhole tools and shared downhole modules that are generally configured to gather wellbore and formation data and information and convey these to surface equipment 105 via the retrievable logging cable 133 or to a logging unit 140 (i.e., a surface logging facility) on return of the downhole logging device 110 to the surface 102. The logging unit 140 is provided with all necessary equipment (e.g., processors, data storage, logging monitor) to accomplish downhole data storage, processing, analysis or monitoring.

The downhole logging device 110 includes one or more downhole tools having at least one data sensor each that captures downhole data measurements from the wellbore 101. Additionally, the downhole logging device 110 also includes a data compression unit that provides a data compression portion and a residual data portion of the downhole data measurements, wherein the data compression portion of the downhole data measurements is provided for transmission to the surface equipment 105 for display on a logging monitor via the retrievable logging cable 133, and the residual data portion is stored downhole.

Figure 2:
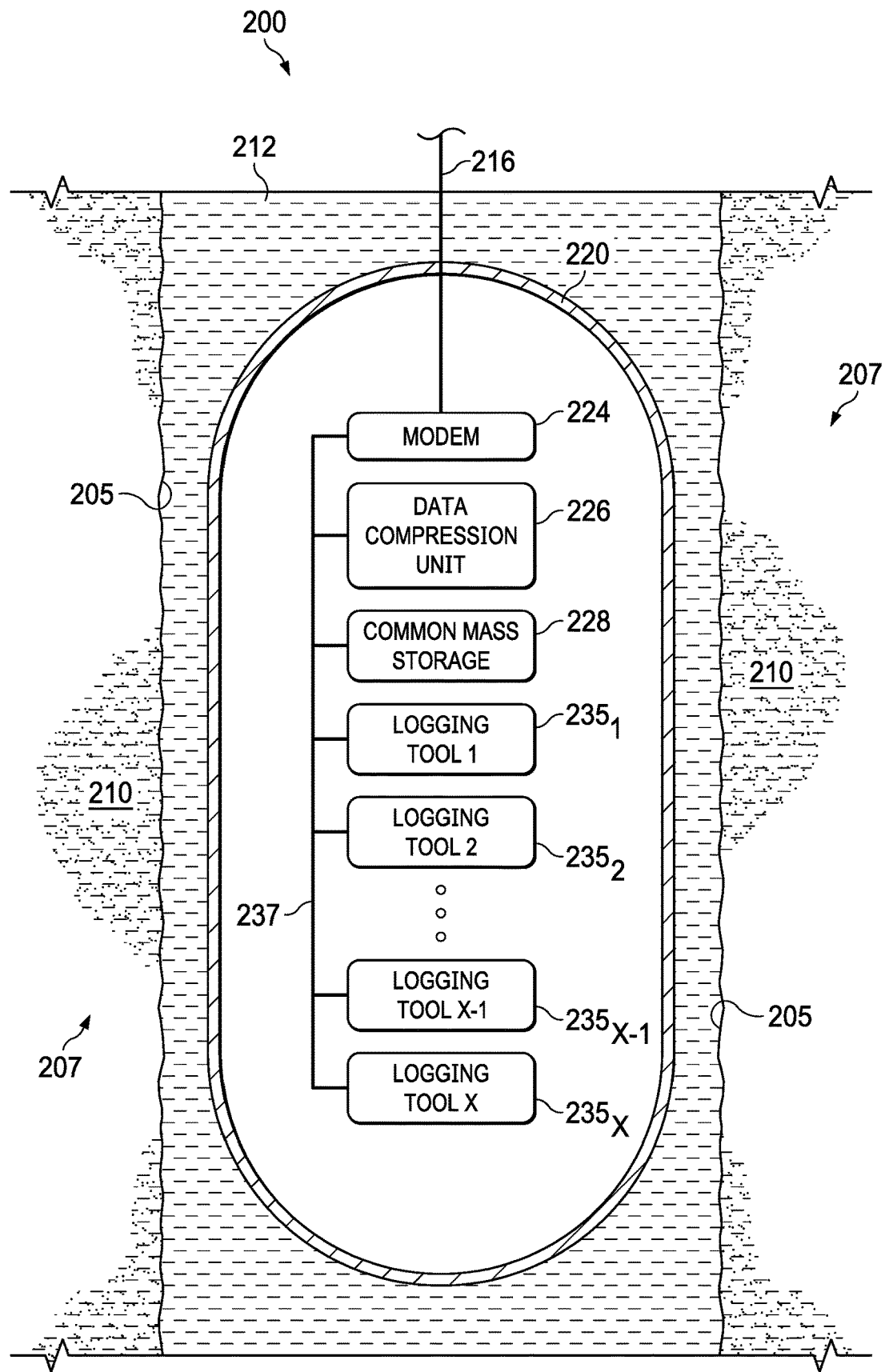
FIG. 2 illustrates a diagram of an example of a downhole measurement environment constructed according to the principles of the disclosure.

FIG. 2 illustrates a diagram of an example of a downhole measurement environment, generally designated 200, constructed according to the principles of the disclosure. The downhole measurement environment 200 includes a wellbore 205 containing a wellbore fluid 212, a subterranean formation 207 containing a formation fluid 210, and a retrievable logging cable 216 connected to a downhole logging device 220 as may be employed in the wellbore logging system 100 of FIG. 1.

The downhole logging device 220 includes a set or random collection of modules including a modem 224 connected to the retrievable logging cable 216, a data compression unit 226, a common mass storage memory 228, and logging tools $235_1$, $235_2$, ..., $235_{X-1}$, $235_X$, (referred to collectively as logging tools $235_1$-$235_X$), as shown. The downhole logging device 220 also includes module interconnections 237 that represent interconnections configured to convey measurement data and control instructions between modules. Each of the logging tools $235_1$-$235_X$ has at least one sensor that provides downhole data measurements of interest to this logging operation.

The modem 224 provides an interface between the retrievable logging cable 216 and the module interconnections 237. In this role, the modem 224 receives control directions for downhole modules from up-hole surface equipment and formats a part of the downhole data measurements for transmission to the up-hole surface equipment. This part of the downhole data measurements is processed in substantially real time for transmission up the retrievable logging cable 216 to the up-hole surface equipment (e.g., the surface equipment 105 of FIG. 1) for data monitoring.

Correspondingly, the data compression unit 226 provides a data compression portion of the downhole data measurements from the logging tools $235_1$-$235_X$. The data compression corresponding to this data compression portion may be tailored to separate or individual data requirements generated by each of the logging tools $235_1$-$235_X$. Additionally, the data compression unit 226 provides a residual data portion of the downhole data measurements for storage downhole and later use. In one example, the residual data portions from the logging tools $235_1$-$235_X$ are stored within each of the respective logging tools $235_1$-$235_X$. In another example, all residual data portions are stored in the common mass storage memory 228. Of course, some residual data portions may be stored in each location as operating conditions may dictate.

Figure 3:
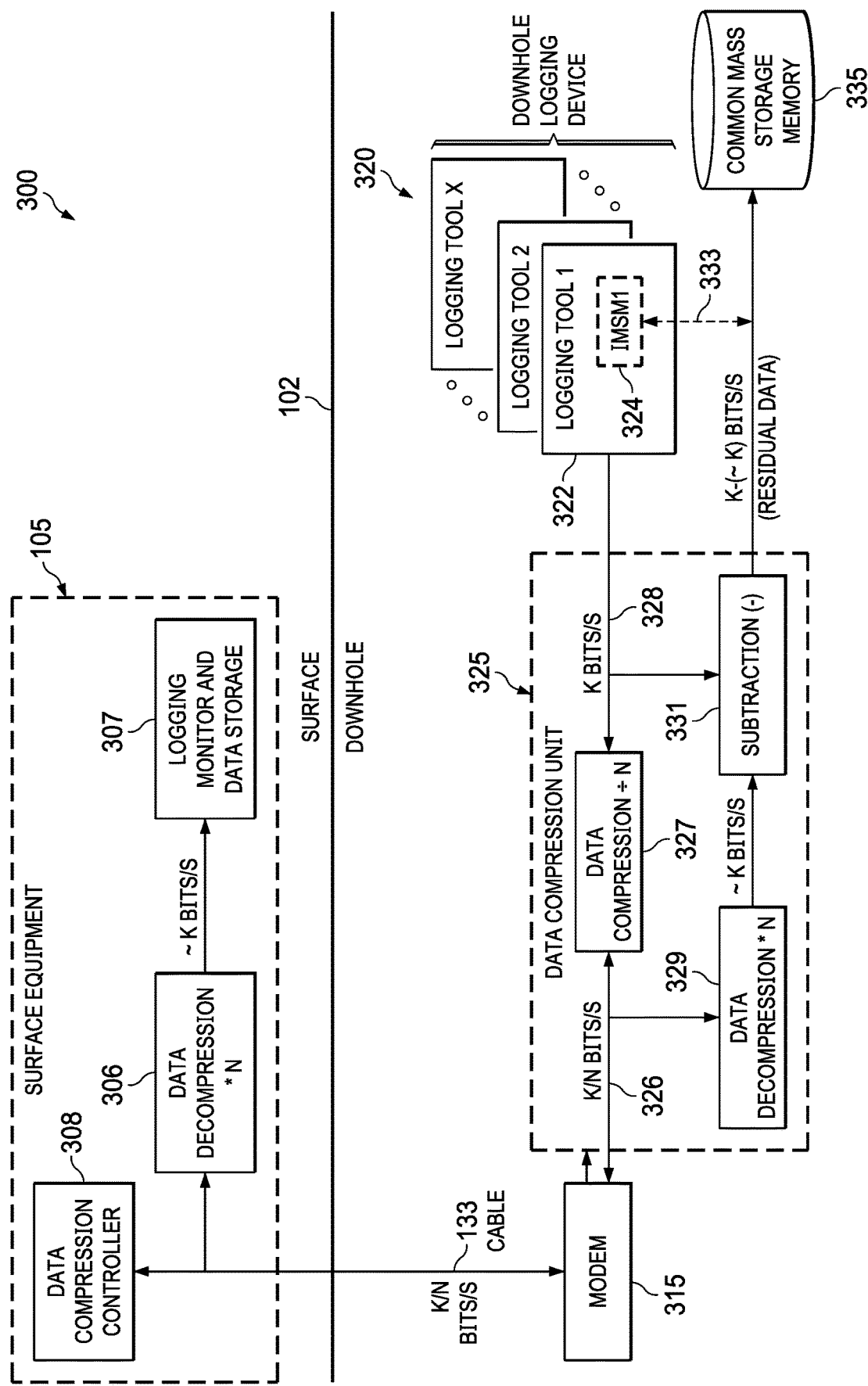
FIG. 3 illustrates a more detailed example of a wellbore logging system constructed according to the principles of the disclosure.

FIG. 3 illustrates a more detailed example of a wellbore logging system, generally designated 300, within the environment of the system 100 of FIG. 1. The wellbore logging system 300 includes the surface equipment 105 having a data decompression unit 306, a logging monitor and data storage unit 307 and a data compression controller 308. The wellbore logging system 300 also includes the retractable logging cable 133, a modem 315 and a downhole logging device 320 having a set of downhole tools (logging tool 1-logging tool X), wherein at least one logging tool (e.g., Logging Tool 322) includes an individual mass storage memory (IMSM) and an IMSM1 324 of the logging tool 1 is typical of all included IMSMs. The downhole logging device 320 of the wellbore logging system 300 additionally includes a data compression unit 325 having a data compression section 327, a data decompression section 329, and a subtraction section 331. The wellbore logging system 300 further includes a common mass storage memory 335.

Generally, a data compression portion of downhole data measurements is collected from a wellbore, such as the wellbore 101 of FIG. 1, for transmission to the surface equipment 105 in substantially real time (including real time), via the retractable logging cable 133. The data decompression unit 306 provides a decompression of each data compression portion of these downhole data measurements for data monitoring and storage at the surface by the logging monitor and data storage unit 307. This data monitoring assures that the data compression (and data decompression) provides data of sufficient quality to assure that downhole data acquisition is progressing along an acceptable path. Additionally, transmitting only the data compression portion of the downhole data measurements allows a maximum bandwidth utilization of the retractable logging cable 133.

Downhole storage of a residual data portion of each downhole data measurement allows it to be recovered up-hole and recombined up-hole with its corresponding decompression of each data compression portion. For the case of lossless data compression of the data compression portion in recombination with its residual data portion, uncompressed data quality can be achieved while employing data compression to maximize logging cable transmission rates. In many cases, "lossy" data compression of the data compression portion can be selected to improve data logging cable transmission rates and provide acceptable recombination data quality.

The data compression controller 308 may be employed in concert with the retrievable logging cable 133 and the modem 315 to select and direct data compression characteristics or compression techniques tailored for optimization of different downhole logging tools. The data compression controller 308 may be employed to structure data compressions for a collection of downhole tools designed to operate at different sampling rates, a set of downhole tools designed to operate at about the same sampling rate or a combination of both. The primary role of the data compression controller 308 is to maintain downhole data quality at a specified minimum while maximizing transmission data speed of the retractable logging cable 133.

The downhole logging device 320 includes logging tools (1-X) wherein at least one logging tool of the downhole logging device 320 includes an individual mass storage memory (IMSM). In the illustrated example of FIG. 3, each downhole tool of the downhole logging device 320 includes an individual mass storage memory (IMSM) and at least one sensor configured to collect downhole data. Each of these sensors is typically a different type of sensor selected to cover a type or range of downhole data measurements applicable to the characteristics of and formations associated with each wellbore.

As noted earlier, the data compression unit 325 includes a data compression section 327, a data decompression section 329 and a subtraction section 331. Here the data compression unit 325 is in communication with the data compression controller 308 via the retractable logging cable 133 and a data path 326, as shown, to select a type of data compression that corresponds to each of the downhole logging tools employed in the downhole logging device 320. Each corresponding downhole data measurement is data compressed by the data compression section 327 for transmission up-hole via the retractable logging cable 133 and decompressed up-hole (data decompression 306) to provide logging data monitoring and storage by the up-hole logging monitor and data storage unit 307.

The data compression unit 325 can vary its compression time and compression type depending on the type of data being compressed. The tailoring of compression times to meet data type and sampling requirements allows a more diverse set of downhole tools to be employed. Additionally, the data compression unit 325 can vary its sampling rate of each downhole tool as required by different downhole tools. Correspondingly, the sampling rate may be selected during logging operations to meet downhole tool or wellbore traversing situations or requirements. That is, some downhole tools may need to be sampled often, while others may require less sampling to meet data quality requirements. The data compression unit 325 can vary its type of data compression for each of the set of downhole tools employed and adapt its sampling rate to modify and improve data quality for each of the set of downhole tools or select just part of the set of downhole tools for data quality improvement. These settings can be selected at the start of a logging run or be modified during logging operations to focus on one or more specific downhole tools of interest.

Additionally, each downhole data compression undergoes a downhole data decompression by the data decompression section 329. Generally, this downhole data decompression is subtracted from its corresponding downhole data measurement (data path 328) to provide a corresponding residual data portion for downhole storage. This downhole storage is normally provided by the common mass storage memory 335. However, the downhole storage may be provided by an individual mass storage memory (IMSM) associated with the logging tool providing the downhole data measurement. This IMSM storage may be a temporary storage before being transferred (via the data path 333) to the common mass storage memory 335, or it may be a more permanent storage that is not transferred to the common mass storage memory 335. The residual data portions, so stored, are recombined up-hole, at the surface, with corresponding previously decompressed downhole data measurements to provide reconstructed downhole data measurements of enhanced fidelity.

Figure 4:
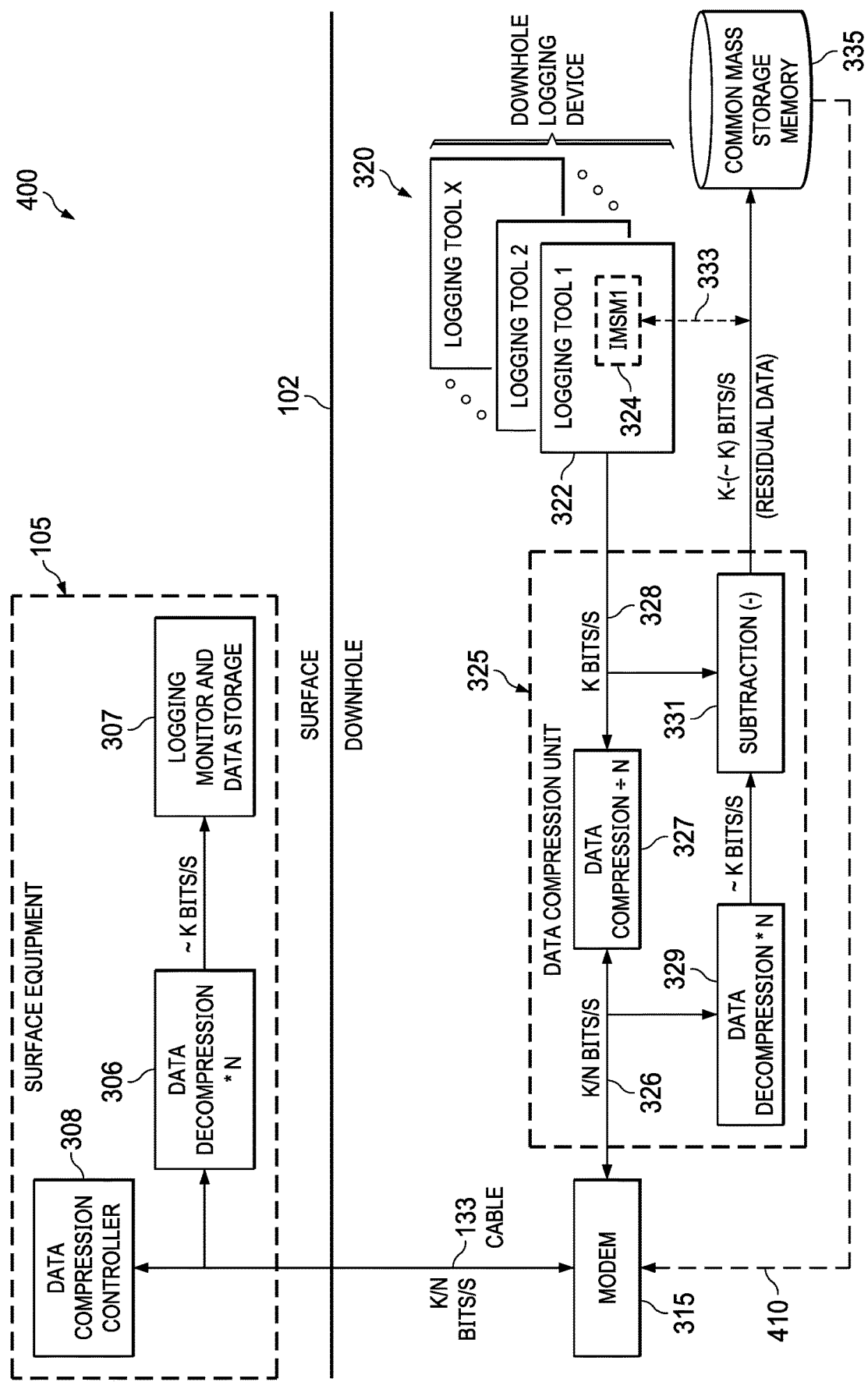
FIG. 4 illustrates a diagram of another example of a wellbore logging system constructed according to the principles of the disclosure.

FIG. 4 illustrates a diagram of an example of another wellbore logging system 400 constructed according to the principles of the disclosure. The wellbore logging system 400 extends the capability of the wellbore logging system 300 by including a downhole memory data path 410 to the modem 315. This downhole memory data path 410 allows the downhole mass storage memories (e.g., the individual mass storage memories (IMSMs) and the common mass storage memory 335) to provide stored residual data portions to the modem 315 for transmission over the retrievable logging cable 133 to the surface equipment 105 during non-logging operating times and normally while a downhole tool is still within the wellbore. (Also, note that up-hole data decompression 306 is not required for processing the stored residual data portions.) Additionally, this feature may be employed to provide or test for full downhole data precision while still within the wellbore. This feature provides for proving various downhole tool combinations or arrangements prior to the start of logging operations.

Figure 5:
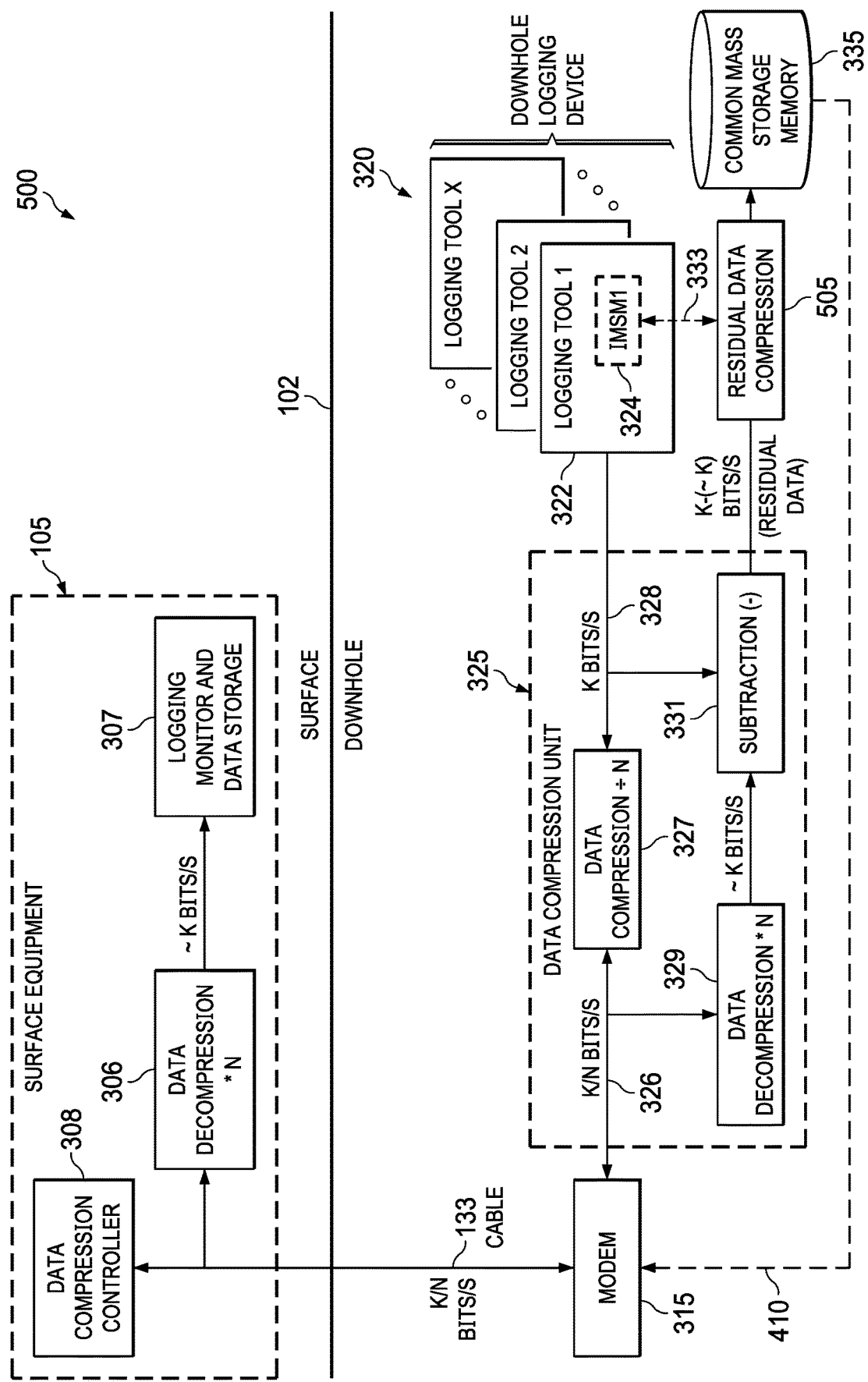
FIG. 5 illustrates a diagram of yet another example of a wellbore logging system constructed according to the principles of the disclosure.

FIG. 5 illustrates a diagram of an example of another wellbore logging system 500 constructed according to the principles of the disclosure. The wellbore logging system 500 extends the capability of the wellbore logging system 400 by including a residual data compression unit 505 before mass storage of residual data portions that have been data compressed. In addition to the added features discussed with respect to FIG. 4, this approach provides for additional downhole logging time by effectively extending existing downhole mass storage memory capability.

Figure 6:
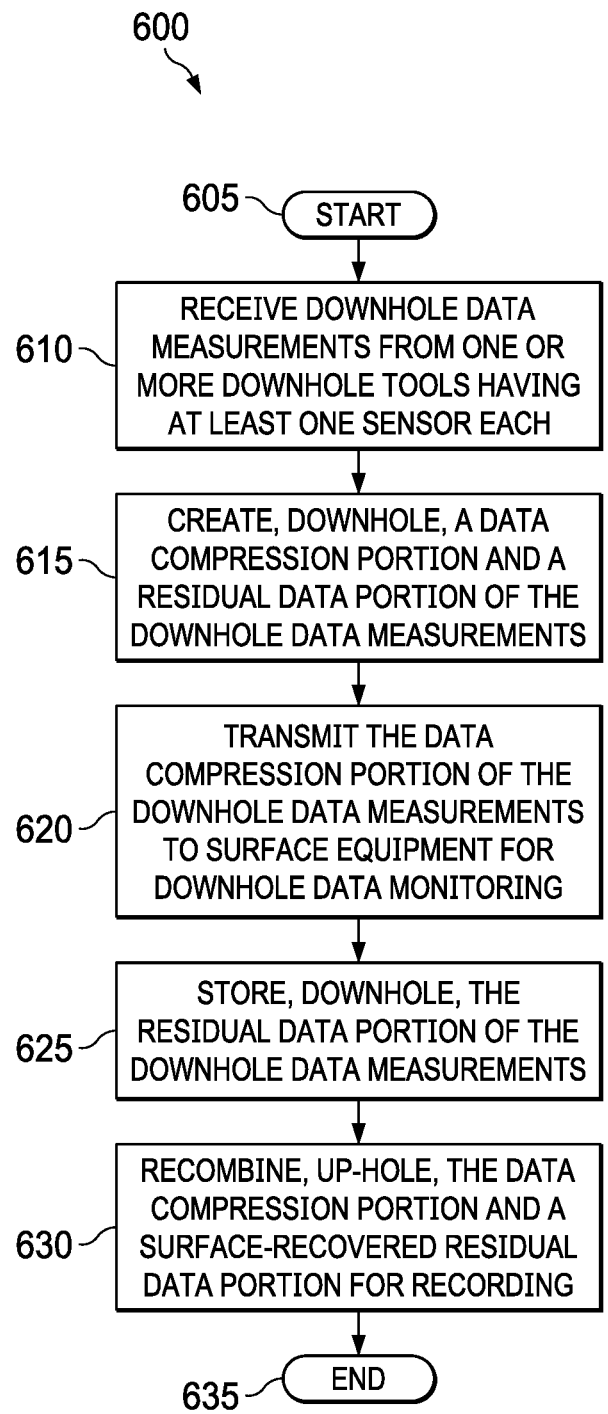
FIG. 6 illustrates a flow diagram of an example method of logging a wellbore carried out according to the principles of the disclosure.

FIG. 6 illustrates a flow diagram of an example of a method of logging a wellbore, generally designated 600, carried out according to the principles of the disclosure. The method 600 starts in a step 605.

In a step 610, downhole data measurements are received from one or more downhole tools in the wellbore. The one or more downhole tools each have at least one data sensor. A data compression portion and a residual data portion of the downhole data measurements are created downhole in a step 615. The data compression portion of the downhole data measurements are transmitted to surface equipment in a step 620. The data compression portion can be used at the surface for downhole data monitoring. In one example, the data compression portion of the downhole data measurements is transmitted to the surface equipment in real time. In a step 625, the residual data portion of the downhole data measurements are stored downhole. The residual data portion can be compressed before being stored downhole. In one example, the downhole data measurements can be converted to a lossless data compression of the residual data portion before being stored downhole.

The data compression portion and a surface-recovered residual data portion are recombined up-hole in a step 630. In one example, the residual data portion of the downhole data measurements is stored downhole, retrieved at the surface at the end of a logging run, and reunited with a decompression of the data compression portion of the downhole data measurements. In yet another example, the residual data portion is stored downhole and transmitted, or a portion thereof is transmitted, to the surface equipment between logging operations. The combined portions can then be recorded. The method 600 ends in a step 635.

While the method disclosed herein has been described and shown with reference to particular steps performed in a particular order, it will be understood that these steps may be combined, subdivided, or reordered to form an equivalent method without departing from the teachings of the disclosure. Accordingly, unless specifically indicated herein, the order or the grouping of the steps are not limitations of the disclosure.

The description and drawings included herein serve to illustrate the principles of the disclosure. It will thus be appreciated that those skilled in the art will be able to devise various arrangements that, although not explicitly described or shown herein, embody the principles of the disclosure and are included within its scope. Furthermore, all examples recited herein are principally intended expressly to be for pedagogical purposes to aid the reader in understanding the principles of the disclosure and concepts contributed to furthering the art, and are to be construed as being without limitation to such specifically recited examples and conditions. Moreover, all statements herein reciting principles and aspects of the disclosure, as well as specific examples thereof, are intended to encompass equivalents thereof. Additionally, the term, "or," as used herein, refers to a non-exclusive OR, unless otherwise indicated. Furthermore, directional terms, such as "above", "below", "upper", "lower", etc., are used only for convenience in referring to the accompanying drawings. Additionally, it is to be understood that the different embodiments of the disclosure may be utilized in various orientations, such as inclined, inverted, horizontal, vertical, etc., and in various configurations, without departing from the principles of the disclosure. Those skilled in the art to which this disclosure relates will appreciate that other and further additions, deletions, substitutions and modifications may be made to the described examples.

A portion of the above-described apparatus, systems or methods may be embodied in or performed by various digital data processors, wherein the processors are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

Various aspects of the disclosure can be claimed including the apparatuses, systems and method as disclosed herein. Aspects disclosed herein include:

A. A downhole logging device, including (1) one or more downhole tools having at least one data sensor each and configured to capture downhole data measurements from a wellbore, and (2) a data compression unit configured to provide a data compression portion and a residual data portion of the downhole data measurements, wherein the data compression portion of the data measurements is provided for transmission to surface equipment, and the residual data portion is stored downhole.

B. A method of logging a wellbore, including (1) receiving downhole data measurements from one or more downhole tools having at least one data sensor; (2) creating, downhole, a data compression portion and a residual data portion of the downhole data measurements; (3) transmitting the data compression portion of the downhole data measurements to surface equipment, and (4) storing, downhole, the residual data portion of the downhole data measurements.

C A wellbore logging system, including: (1) surface equipment operable for monitoring logging operations in a wellbore based on downhole data measurements; and (2) a downhole logging device, coupled to the surface equipment through the downhole communications link, having (a) one or more downhole tools having at least one data sensor each that captures the downhole data measurements from the wellbore, and (b) a data compression unit that provides a data compression portion and a residual data portion of the downhole data measurements, wherein the data compression portion is provided, via the downhole communications link, to the surface equipment for the monitoring, and the residual data portion is stored downhole.

Each of aspects A, B, and C can have one or more of the following additional elements in combination:

Element 1: wherein the data compression portion of the data measurements is provided for transmission to the surface equipment in substantially real time. Element 2: wherein the residual data portion of the downhole data measurements stored downhole is retrieved when the one or more downhole tools is returned to the surface. Element 3: wherein a corresponding residual data portion is recombined with a decompression of a data compression of the downhole data measurements. Element 4: wherein the residual data portion of the downhole data measurements is provided for transmission to the surface equipment while stored downhole. Element 5: wherein the residual data portion of the downhole data measurements is data compressed before being stored downhole. Element 6: wherein the residual data portion is data compressed using a lossless data compression. Element 7: further comprising a data compression controller configured to select downhole data compression characteristics tailored to match a specific downhole data measurement requirement for at least one type of the downhole data measurements. Element 8: wherein the transmitting is performed in substantially real time. Element 9: further comprising retrieving at the surface the residual data portion of the downhole data measurements stored downhole at the end of a logging run. Element 10: further comprising combining the residual data portion of the downhole data measurements at the surface with a decompression of the corresponding data compression portions of the downhole data measurements. Element 11: wherein the transmitting the data compression portion is at a first time and the method further comprises transmitting at least a part of the residual data portion to the surface equipment at a different second time before the end of a logging run. Element 12: further comprising converting the residual data portion to a lossless residual data compression before being stored downhole. Element 13: wherein the surface equipment retrieves the residual data portion at the end of a logging run and recombines the residual data portion at the surface with a decompression of the data compression portion. Element 14: wherein the downhole logging device further includes a modem that is coupled to the downhole communications link and that transmits the residual data portion of the downhole data measurements to the surface equipment while stored downhole. Element 15: further comprising a residual data compression unit that data compresses the residual data portion before it is stored downhole. Element 16: further comprising a residual data compression unit that data compresses the residual data portion before it is stored downhole. Element 17: wherein the surface equipment includes a surface data compression controller that selects downhole data compression characteristics tailored to match a specific downhole data measurement requirement for at least one type of the downhole data measurements.

What is claimed is:

1. A downhole logging device, comprising:
   one or more downhole tools having at least one data sensor and configured to capture downhole data measurements from a wellbore, and
   a processor configured to provide a data compression portion and a residual data portion of the downhole data measurements, wherein the data compression portion of the data measurements is provided for transmission to surface equipment via a downhole communication link and compressed according to both a telemetry rate of the downhole communication link and a sampling rate of at least one of the one or more downhole tools, the residual data portion is stored downhole, and the residual data portion is the difference between the data compression portion and a full resolution of the downhole data measurements.

2. The device as recited in claim 1 wherein the data compression portion of the data measurements is provided for transmission to the surface equipment in substantially real time.

3. The device as recited in claim 1 wherein the residual data portion of the downhole data measurements stored downhole is retrieved when the one or more downhole tools is returned to a surface.

4. The device as recited in claim 3 wherein the residual data portion of the downhole data measurements is recombined with a decompression of the data compression portion of the downhole data measurements.

5. The device as recited in claim 1 wherein the residual data portion of the downhole data measurements is data compressed before being stored downhole.

6. The device as recited in claim 5 wherein the residual data portion of the downhole data measurements is data compressed using a lossless data compression.

7. The device as recited in claim 1 wherein the device includes multiple of the downhole tools that are different types of downhole tools and data compression of the data compression portion is tailored for the different types of the downhole tools.

8. The device as recited in claim 1 wherein the residual data portion of the downhole data measurements is provided for transmission to the surface equipment while the device is downhole.

9. A method of logging a wellbore, comprising:
   receiving downhole data measurements from one or more downhole tools having at least one data sensor;
   creating, downhole, a data compression portion and a residual data portion of the downhole data measurements;
   transmitting the data compression portion of the downhole data measurements to surface equipment at the surface via a downhole communication link, and
   storing, downhole, the residual data portion of the downhole data measurements, wherein the residual data portion is the difference between the data compression portion and a full resolution of the downhole data measurements and creating the data compression portion includes compressing the downhole data measurements according to a telemetry rate of the downhole communication link and a sampling rate of at least one of the one or more downhole tools.

10. The method as recited in claim 9 wherein the transmitting is performed in substantially real time.

11. The method as recited in claim 9, further monitoring the downhole data measurements at the surface using the data compression portion.

12. The method as recited in claim 9 further comprising retrieving at the surface the residual data portion of the downhole data measurements stored downhole at an end of a logging run and combining the residual data portion of the downhole data measurements at the surface with a decompression of the corresponding data compression portions of the downhole data measurements.

13. The method as recited in claim 9, wherein the transmitting the data compression portion of the downhole data measurements is at a first time and the method further comprises transmitting at least a part of the residual data portion of the downhole data measurements to the surface equipment at a different second time before an end of a logging run.

14. The method as recited in claim 9 further comprising converting the residual data portion of the downhole data measurements to a lossless residual data compression before being stored downhole.

15. A wellbore logging system, comprising:
   surface equipment operable for monitoring logging operations in a wellbore based on downhole data measurements; and
   a downhole logging device, coupled to the surface equipment through a downhole communications link, including:
      one or more downhole tools having at least one data sensor each that captures the downhole data measurements from the wellbore, and
      a processor that provides a data compression portion and a residual data portion of the downhole data measurements, wherein the data compression portion of the downhole data measurements is provided, via the downhole communications link, to the surface equipment for the monitoring, the residual data portion of the downhole data measurements is stored downhole, the residual data portion is the difference between the data compression portion and a full resolution of the downhole data measurements, and the data compression portion is compressed according to both a telemetry rate of the downhole communication link and a sampling rate of at least one of the one or more downhole tools.

16. The system as recited in claim 15 wherein the surface equipment retrieves the residual data portion of the downhole data measurements at the end of a logging run and recombines the residual data portion of the downhole data measurements at the surface with a decompression of the data compression portion.

17. The system as recited in claim 15 wherein the downhole logging device further includes a modem that is coupled to the downhole communications link and that transmits the residual data portion of the downhole data measurements to the surface equipment while the device is downhole.

18. The system as recited in claim 15 further comprising a processor that data compresses the residual data portion of the downhole data measurements before it is stored downhole.

19. The system as recited in claim 15 further comprising a common mass storage memory that provides downhole storage for the residual data portion of the downhole data measurements.

20. The system as recited in claim 15, wherein the surface equipment includes a surface data compression controller that selects downhole data compression characteristics tailored to match a specific downhole data measurement requirement for at least one type of the downhole data measurements.

* * * * *